United States Patent
Tsukamoto

(10) Patent No.: US 7,113,235 B2
(45) Date of Patent: Sep. 26, 2006

(54) LIQUID CRYSTAL DISPLAY DEVICE

(75) Inventor: Takayoshi Tsukamoto, Hyogo-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 281 days.

(21) Appl. No.: 10/391,017

(22) Filed: Mar. 19, 2003

(65) Prior Publication Data

US 2003/0218700 A1 Nov. 27, 2003

(30) Foreign Application Priority Data

Mar. 25, 2002 (JP) .......................... 2002-083945

(51) Int. Cl.
*G02F 1/1333* (2006.01)

(52) U.S. Cl. .......................... 349/58; 349/65
(58) Field of Classification Search ................ 349/58, 349/61, 62, 63, 64, 65
See application file for complete search history.

(56) References Cited

U.S. PATENT DOCUMENTS

| | | | | |
|---|---|---|---|---|
| 5,654,779 A | * | 8/1997 | Nakayama et al. .......... | 349/58 |
| 6,490,016 B1 | * | 12/2002 | Koura .......................... | 349/58 |
| 6,552,761 B1 | * | 4/2003 | Seo et al. ..................... | 349/58 |
| 6,597,416 B1 | * | 7/2003 | Momose ....................... | 349/60 |
| 6,654,078 B1 | * | 11/2003 | Kato et al. ................... | 349/58 |
| 6,741,299 B1 | * | 5/2004 | Fukayama et al. ........... | 349/58 |

* cited by examiner

*Primary Examiner*—Toan Ton
*Assistant Examiner*—David Chung
(74) *Attorney, Agent, or Firm*—Oblon, Spivak, McClelland, Maier & Neustadt, P.C.

(57) ABSTRACT

A spring member 31 includes side, upper and lower plates 32, 33 and 34 and a cut-out portion 35 on its upper plate 33 for positioning. The upper and lower plates 33 and 34 define an opening. The spring member 31 receives an assembling member or bezel 24 and a rear light unit 2 with the cut-out portion 35 engaged in an upper plate 23 of the bezel 24 and puts them together while a liquid crystal display panel 12 is held between the bezel 24 and the light unit 2. The upper plate 23 of the bezel 24 has a step 25 for positioning of the spring member 31. Due to elasticity of the upper and lower plates 33 and 34 of the spring member 31, the bezel 24 and the light unit 2 are compressively held with a constant distance defined between them by the spring member 31. An optical sheet 11 covers the liquid crystal display panel uniformly. Thus, undulation or crinkles of the sheet 11 hardly take place on the side of a cold cathode fluorescent lamp 7, uneven brightness and distortion of images can be substantially avoided and display dignity is substantially improved.

14 Claims, 3 Drawing Sheets

LIQUID CRYSTAL DISPLAY DEVICE

FIELD OF THE INVENTION

This invention generally relates to a liquid crystal display device and, in particular, to a liquid crystal display device with a surface light source.

BACKGROUND OF THE INVENTION

A prior art liquid crystal display device has such a structure as is disclosed in Japanese Patent Publication No. Tokkai 2001-125073, for instance. It is equipped with a rear light unit as a surface light source, a liquid crystal display panel provided at a front and main surface of the light unit, and an L-shape assembling member or bezel disposed around a frame portion of the panel on its front surface side. The bezel and the rear light unit hold the panel and are put together by an adhesive tape. The rear light unit is fixed on the bezel with a space set between them.

It is, however, relatively difficult to maintain a proper space between the rear light unit and the bezel in the prior art liquid crystal display device when the tape is applied to put them together. In the case, further, that the tape is not uniformly fixed on them, undulation or crinkles may be caused on the peripheral surface of the panel and the panel may have a less uniform display.

SUMMARY OF THE INVENTION

The present invention is generally to provide a liquid crystal display device with such a structure that a surface light source and an assembling member or bezel are easily fixed and with an improved display quality.

According to general aspects of the present invention, a liquid crystal display device includes a surface light source, a liquid crystal display panel provided opposite to a main surface of the surface light source, an assembling member or bezel to support the display panel around peripheries of the panel on the front surface of the panel, and a spring member to compressively hold the surface light source and the bezel while the panel is held between the surface light source and the bezel thereby to easily fix the panel, the surface light source and the bezel with a proper space defined between the surface light source and the bezel.

BRIEF DECSRIPTION OF THE DRAWINGS

DETAILED EXPLANATION OF THE INVENTION

Figure 1:
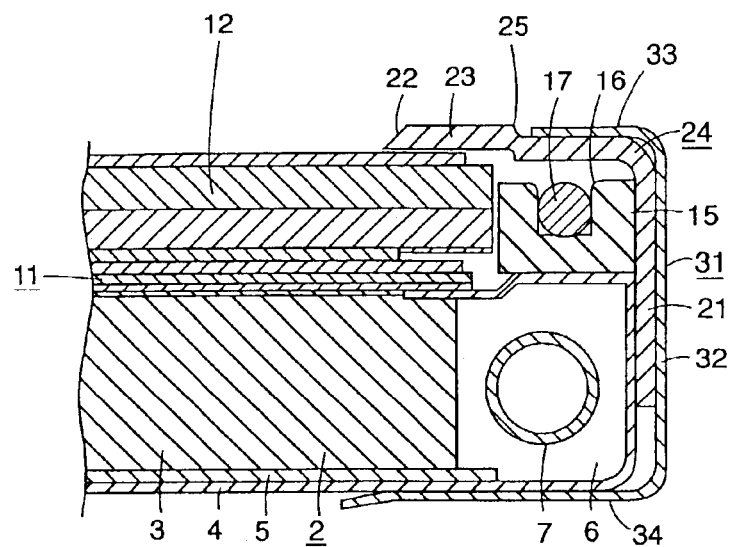
FIG. 1 is a sectional view of an embodiment of the present invention cut along the line I–I' of a liquid crystal display device shown in FIG. 3.

As shown in FIGS. 1–5, a liquid crystal display device 1 is equipped with a rear light unit 2 as a surface light source. This rear light source 2 includes a light guide plate 3 made of a rectangular acrylic resin and is received in a metal light case 4. The light case 4 has front, back and side plates and an opening defined around its front surface. A sheet-like light reflector 5 is held between the light guide plate 3 and the light case 4. The reflector 5 reflects incident light from the light guide plate 3 toward a main and front surface of the light source 2. The light case 4 has a space which is defined in the inside of a longitudinal side of the case 4 and includes a lamp house 6. The lamp house 6 is C-shaped in cross section and its inside surface is reflective. The lamp house 6 receives a straight line cold cathode fluorescent lamp 7 in its inside as a linear light source facing the side surface of the light guide plate 3. Light from the fluorescent lamp 6 directly, and reflecting from the inner surface, illuminates the side of the light guide plate 3. There are driver circuit boards, etc. not shown but provided along the longitudinal side opposite to the one where the lamp house is disposed.

Optical sheets 11 including a prism sheet, diffusion sheet, etc. are provided on the front side of the light guide plate 3. A liquid crystal display panel 12 is disposed opposite to the main and front surface of the optical sheet 11. The light guide plate 3, optical sheet 11 and liquid crystal display panel 12 are laminated together.

A plastic frame 15 is provided at an edge portion of an upper plate of the lamp case 4 and has a groove 16 on its upper side to receive a lamp ground cable 17 along the longitudinal direction of the lamp 7.

A plastic assembling member or bezel 24 is L-shaped in cross section and frame-like in plan view, and has side and upper plates 21 and 23 to cover the upper corner portion of the light case 4, the frame 15 and a peripheral part of the display panel 12. The bezel 24 has an opening 22 defined for the display panel 12. The upper plate 23 has a step 25 provided over the lamp house 6. The upper plate 23 has a positioning member 26 at its central part of the lower longitudinal side shown in FIG. 3. A spring member or clip 31 covers and compressively holds the bezel 24 and a part of the back plate of the lamp case 4. The clip 31 is made of a stainless steel plate spring which is elastic, 0.2 mm in thickness, for instance, and C-shaped in cross section. The clip 31 is composed of a side plate 32, a first holding member or upper plate 33 and a second holding member or bottom plate 34. The height of the side plate 33 corresponds to the total one of the side plate 21 of the bezel 24 and the lower part of the rear light source 2. The upper and side plates 33 and 32 are bent at their joint portion. Likewise, the side and bottom plates 32 and 34 are also bent at their joint portion. The upper plate 33 has a cut-out portion 35 which is used to check whether it is upper or lower in position, to assemble the bezel 24 and the lamp case 4 and to position itself in engagement with the positioning member 26.

Figure 2:
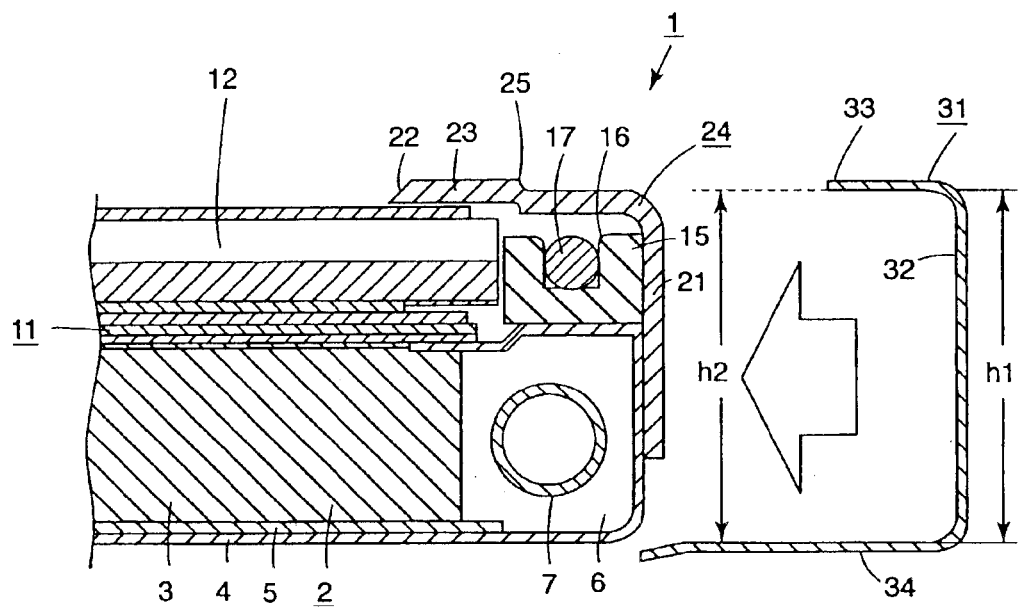
FIG. 2 shows a sectional view of the assembly of a spring member and other components shown in FIG. 1.

The clip 31 is moved to the bezel 24 and the light case 4 in the direction shown in FIG. 2 by an arrow until the edge of the upper plate 33 is close to the step 25 and the bezel 24 and the light case 4 are tightly assembled by the clip 31. Where the height of the step 25 is high enough for the clip 31 to receive the bezel 24 and the light case 4, the liquid crystal display device is kept thin in thickness as a whole. Since the clip 31 is made of metal, it is thinner in thickness than a clip made of resin. In order to make the upper plate 23 of the bezel 24 as small in width as possible, the upper plate 33 maybe smaller in width than the bottom plate 34. As the upper plate 33 becomes smaller in width as described above, the frame of the liquid crystal display device 1 is also smaller in width so that the ratio of display area to the total plane of the liquid crystal display device 1 may increase substantially and that the device 1 may be compact in size. Further, the clip 31 can fix the bezel 24 and the light case 4 more tightly in the case that the bottom plate 34 is wider in width that the upper plate 33.

Further, in order for the spring member 31 to compressively and firmly hold the bezel 24 and the light case 4, the inner height $h_2$ defined between the upper plate 33 and bottom plate 34 is set to be less by 0.3 mm through 0.5 mm than that of the side plate 32. An opening defined by the upper plate 33 and the bottom plate 34 at their edge allows the bottom plate 34 to readily receive the bottom plate of the light case 4 and also makes the spring member 31 easily put the bezel 24 and the light case 4 together.

Figure 3:
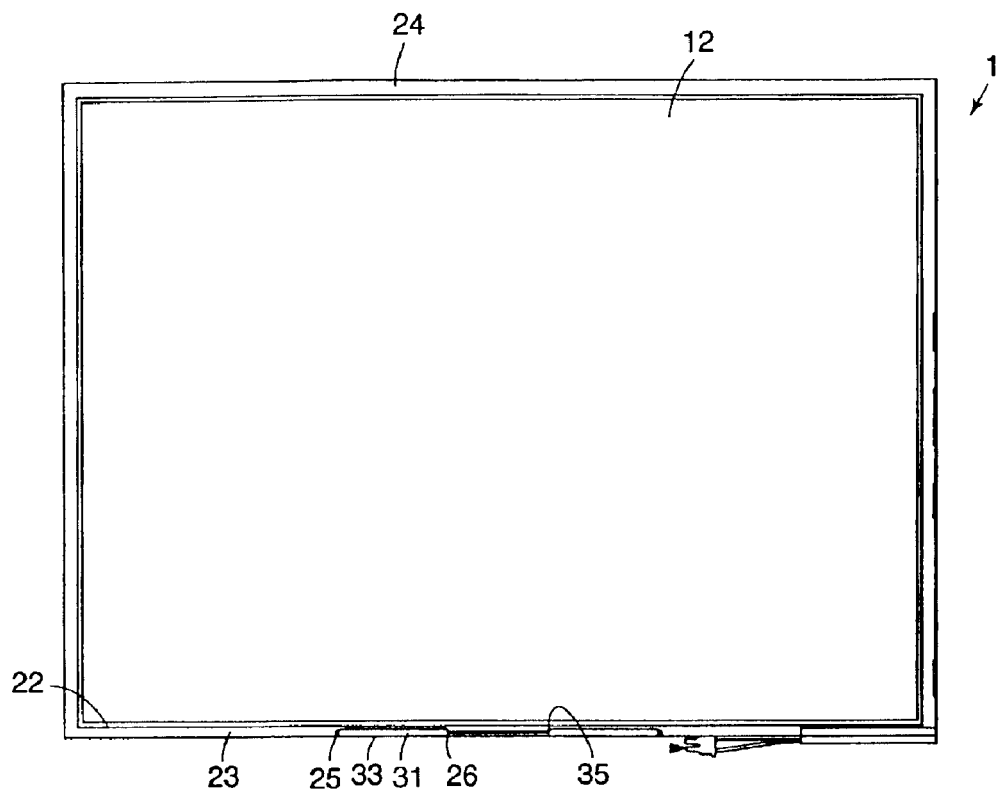
FIG. 3 is a plan view of the liquid crystal display device.
Figure 4:
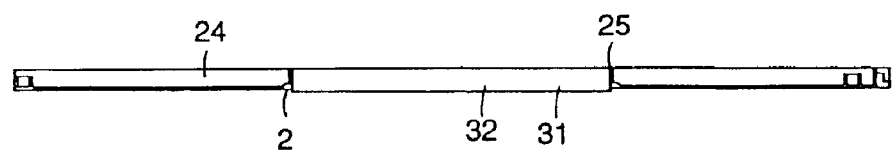
FIG. 4 is aside view of the liquid crystal display device shown in FIG. 3.
Figure 5:
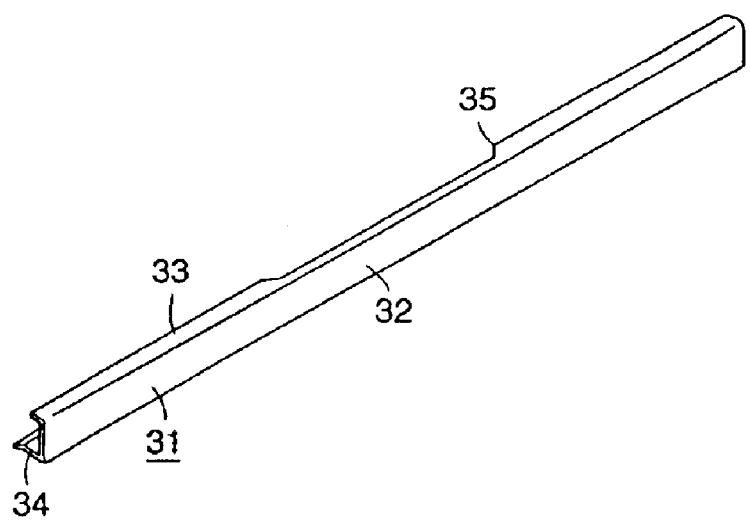
FIG. 5 is a perspective view of the spring member.

The spring member 31 is pushed in a direction of an arrow indicated in FIG. 2 and tightly receives the bezel 24 and the light case 4 with the cut-out portion 35 of the spring member 31 engaged in the upper plate 23 as shown in FIGS. 3 and 5. Thus, the front end of the upper plate 33 is positioned in the step and the spring member 31 puts compressively the bezel 24 and the rear light unit 2 together by its spring force so that the bezel 24 and the light unit 2 can hold the liquid crystal display panel 12.

According to the present embodiment, since the spring member 31 can be set to be constant in size and spring force, there is no substantial dispersion with respect to its assembling work and the side of the cold cathode fluorescent lamp 7 remains satisfactorily unchanged in thickness.

The upper and lower plates 33 and 34 of the spring member 31 can be easily parallel with each other so that the distance between the bezel 24 and the rear light unit 2 is kept constant along the longitudinal axis of the spring member 31. As a result, the optical sheet 11 is uniform on its entire surface so that it does not have any significant undulation on the side of the cold cathode fluorescent lamp 7 as caused by using fixing tapes in a prior art device. In short, the present invention can avoid uneven brightness and distortions of images and improve display dignity.

The embodiment set forth above is directed to the transparent type rear light unit 2 of the liquid crystal display device which illuminates the panel 12 from its back surface and in which light from the back surface passes through the panel 12. The present invention is, however, applicable to not only transparent type but also reflective type liquid crystal display devices. Further, its applications are not limited to rear type surface light sources but include front type surface light sources which are provided opposite to the front side of the panel 12 and have their main surface on the back side of the panel 12.

According to the present invention, a spring member compressively holds a surface light source and bezel between which a liquid crystal display panel is positioned. Thus, such liquid crystal display panel, surface light source and bezel are easily fixed, the space defined between the bezel and the surface light source can be constant and display dignity can be also improved.

What I claim is:

1. A liquid crystal display device comprising:
   a surface light source including a main surface;
   a liquid crystal display panel provided opposite to the main surface of said surface light source;
   an assembling member to cover said liquid crystal display panel; and
   a spring member compressively pressing against both said surface light source and said assembling member to compressively hold said surface light source and said assembling member with said liquid crystal display panel positioned between said surface light source and said assembling member.

2. The liquid crystal display device according to claim 1, wherein said spring member includes a side plate facing said surface light source and said assembling member,
   a first holding portion connected to one end portion of said side plate, and
   a second holding portion connected to another end portion of said side plate,
   said second holding portion being provided opposite to said first holding portion.

3. The liquid crystal display device according to claim 2, wherein said first and second holding portions of said spring member define an opening having the shortest distance at a location other than said end portions of said side plate.

4. The liquid crystal display device according to claim 3, wherein said first holding portion is longer than said second holding portion.

5. The liquid crystal display device according to claim 2, wherein said assembling member has a step in which said first holding portion is engaged.

6. A liquid crystal display device comprising:
   a surface light source including a main surface;
   a liquid crystal display panel provided opposite to the main surface of said surface light source;
   an assembling member to cover said liquid crystal display panel; and
   a slidable spring member to compressively hold said surface light source and said assembling member with said liquid crystal display panel positioned between said surface light source and said assembling member.

7. The liquid crystal display device according to claim 6, wherein said spring member includes a side plate facing said surface light source and said assembling member,
   a first holding portion connected to one end portion of said side plate, and
   a second holding portion connected to another end portion of said side plate,
   said second holding portion being provided opposite to said first holding portion.

8. The liquid crystal display device according to claim 7, wherein said first and second holding portions of said spring member define an opening having the shortest distance at a location other than said end portions of said side plate.

9. The liquid crystal display device according to claim 8, wherein said first holding portion is longer than said second holding portion.

10. The liquid crystal display device according to claim 7, wherein said assembling member has a step in which said first holding portion is engaged.

11. A liquid crystal display device comprising:
    a surface light source including a main surface;
    a liquid crystal display panel provided opposite to the main surface of said surface light source;
    an assembling member to cover said liquid crystal display panel; and
    a spring member to compressively hold said surface light source and said assembling member with said liquid crystal display panel positioned between said surface light source and said assembling member,
    wherein said spring member includes:
    a side plate facing said surface light source and said assembling member,
    a first holding portion connected to one end portion of said side plate, and
    a second holding portion connected to another end portion of said side plate,
    said second holding portion being provided opposite to said first holding portion.

12. The liquid crystal display device according to claim 11, wherein said first and second holding portions of said spring member define an opening having the shortest distance at a location other than said end portions of said side plate.

13. The liquid crystal display devic according to claim 12, wherein said first holding portion is longe than said second holding portion, 14. The liquid crystal display device according to claim 11, wherein said assembling member has a step in which said first holding portion is engaged.

* * * * *